United States Patent Office 3,341,965
Patented Sept. 19, 1967

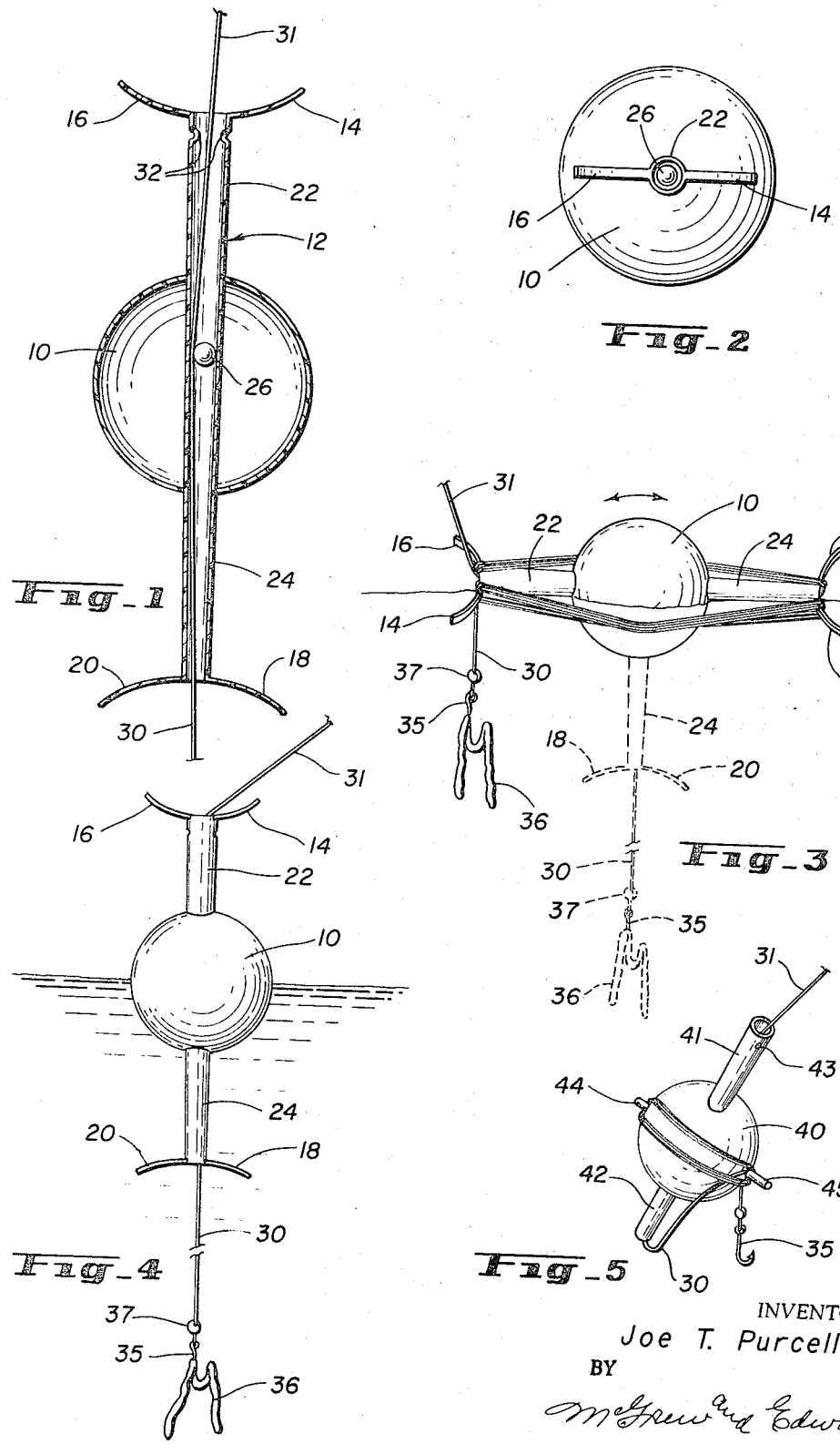

3,341,965
FISHING FLOAT
Joe T. Purcella, 16390 W. 44th Ave.,
Golden, Colo. 80401
Filed Mar. 31, 1965, Ser. No. 444,239
2 Claims. (Cl. 43—43.11)

ABSTRACT OF THE DISCLOSURE

A fishing float has a tapered tube through which the fishing line is passed, and a ball disposed therein temporarily locks the line at a predetermined position. The line, from the float to the hook, may be wrapped from end to end around the tube for casting of the float to a fishing position. The wrapped-around line unreels in the water after casting, releasing the hook and the line beyond the float for dangling in the water. The ends of the tube include loop holding extensions for holding the line wrapped on the float during casting.

---

This invention relates to improvements in fishing tackle and more particularly to improvement in a float and line holder device which permits preselecting the depth of fishing and provides means for casting bait fishing gear.

In bait fishing, it is desirable to dangle a baited hook near or on the bottom, but at a distance from the fisherman. While the placement of the bait at or near the bottom is important, the amount of line extending from the reel to the bait cannot be excessive since the line must normally be retrieved rapidly enough to set the hook in the fish taking the bait. A slack line cannot be jerked properly to set the hook. An ordinary float may provide a means for preselecting the distance from the float to the bait, in other words, the depth the bait is fished, but casting is either impossible or difficult and uncertain due to the length of line beyond the float. For effective casting the float is retrieved to a position near the rod tip while the line beyond the float is merely loose. Additionally, with an ordinary float retrieval of a fish may cause considerable difficulties since there may be a substantial amount of line beyond the float, and once the float contacts the tip of the rod further retrieval of the line cannot normally be accomplished.

Included among the objects and advantages of the present invention is a float and line holder device which provides means for preselecting the amount of line which extends beyond the float to a hook and it provides effective means for casting the float and a baited hook to a predetermined position where the float device automatically unreels the preselected amount of line beyond the float. Another object of the invention is to provide a float which releases from gripping the line on contacting a rod so that substantially the entire line of a float rig may be reeled up on retrieval. Another object of the invention is to provide a simplified means for securely holding and releasing a predetermined amount of line extending beyond the float for bait fishing.

These and other objects and advantages of the invention may be readily ascertained by referring to the following description and appended illustrations in which:

FIG. 1 is a cross-sectional side elevational view of a device according to the invention;

FIG. 2 is a top plan view of a device according to the invention;

FIG. 3 is a perspective view of the device with the fishing line coiled on the float, after casting, and in position for unreeling the bait portion of the line to fishing depth;

FIG. 4 is a schematic view of the float of the invention showing the floating position of the float in fishing condition; and FIG. 5 is a slightly modified device according to the invention.

In the device selected for illustration in FIGS. 1-4, a float member 10 has a tapered tube 12 affixed thereto and extending through the float on both sides. On each end of the tapered tube 12 is a bifurcated end or a pair of prongs. The prongs 14 and 16 at the upper end extend outwardly from the top of the tube and the prongs 18 and 20 extend outwardly from the bottom of the tube in approximately the same direction as those on the other end. The weight of an enclosed line, hook and fishing weight pulls the tube upright in the water so that the float rides with part 22 up out of the water. A ball line holder 26 is reciprocably mounted in the tube and is arranged to wedge against and hold a line 30 at a predetermined point in the tube. A pair of dimples or indentations 32 in the upper part of the tube prevents removal of the ball from that end of the tube and the lower end is of a smaller diameter than the ball. The line 30 is secured in place by holding the tube upright with the small end 24 in the downward position, and by pulling on the lower portion 30 of the line, the ball wedges in the tube holding the line in the predetermined position.

The float portion of the device may be made of cork, plastic, wood, or any other material which will support the weight of the device on water. The tube may be made of metal, plastic and the like, and in a similar manner the ball may be so made. In one form a cork float and a light metal tube with a nylon ball has been found very satisfactory to secure the line, and the metal prongs effectively support the line for winding fishing line for the casting operation.

For casting the float device, the amount of line between the float and hook desired is pulled through the tube with the large end 22 down so the locking ball rests against the indents 32, which permits the line to be pulled freely through the tube. When the desired amount of line is pulled through the tube, the float is inverted with the small end down so that the ball rests against the line, and by pulling the line the ball wedges in the tube and against the line securing it in the desired position. The line end 30 extending through the small end of the tube is provided with a hook 35, weights 37 and bait 36, and is then wound around the prongs on each end of the tube, shown in FIG. 3, with the bait pulled up short to the float. The device may then be cast since there is no excess line hanging from the float. After the float strikes the water the weight of the bait pulls the tube down, shown in dashed lines, dropping one loop of the line from the coil. The float then bobs back up because the weight pulls the other side down. The bait and weights alternately pull down one side then the other to release the line coils from the tube. After all the coils are released the float stands upright, shown in FIG. 4, with the small or weighted end down. In this position the float performs its duties as a float and will bob and oscillate when a fish strikes the bait. The hook 35 attached to the line 30 beyond the float is normally baited and provided with weights 37 so as to take the bait to the bottom of the body of water being fished. When a fish strikes the bait the fisherman sets the hook and begins to retrieve the fish. The line may be reeled in and when the end of the tube 24 contacts the end of the pole the line 31 is pulled releasing the ball from its wedging grip and the line may then be retrieved further through the tube, thus providing an automatic release from the weight and the fish may then be pulled up as closely to the rod as desired.

In the modification shown in FIG. 5 a float 40 is provided with a tapered tube having an upper tube extension 41 and a lower tube extension 42 in the manner described above, and a line 31 extends from the pole through the tube to end 30. The end of line 30 is coiled around a pair of pegs 44 and 45 on opposite sides of the float and at right angles to the tube. The upper part of the tube 41 is provided with indents 43 to act as keepers for a ball which is mounted inside the tube in a manner similar to that described for the other modification. The ball acts as a line keeper or lock in the same manner.

For use of this modified device, the amount of line 30 is drawn through the tube to the desired length with large end 41 down, and by turning the float over with the small end down the ball is wedged in position by pulling the line 30. The line 30 is then coiled around pegs 44 and 45 in the manner of that described above or in a figure eight. The float may then be pulled close to the rod and the whole device cast for fishing. After the float lands on the water the line, weights and the hook pull one coil at a time off the pegs, so that the float oscillates back and forth under the influence of the weight to progressively release the coils until all the coils are removed from the weight. After the coils are removed, the float turns into upright position with the small or heavy end of the tube 42 downwardly and the large end upwardly. The baited hook drops to its predetermined depth.

While the invention has been illustrated by particular devices, there is no intent to limit the spirit or scope of the invention so set forth, except as defined in the following claims.

I claim:

1. A float device for fishing comprising a tapered tube for holding a line extending therethrough; a hook and a weight on the end of the line; a float mounted on said tube with the tube ends extending a substantial distance from opposed sides beyond said float, and the smaller tube end being held downwardly by the weight on the line to weight the float when floating on water; a ball having a diameter larger than the small end of said tube reciprocably mounted in said tube in position to releasably wedge against a line passing through said tube; retaining means in the large end of said tube for retaining said ball therein; and a pair of opposed prongs extending laterally from each end of said tube for holding a coil of line which extends from the small end of said tube, which coil is wrapped from end to end around said tube.

2. A float device for fishing comprising a tapered tube for holding a line extending therethrough; a hook and a weight on the end of the line; a spherical float mounted on said tube with the tube ends extending a substantial distance from opposed sides beyond said float, and the smaller end held downwardly by the weight on the line to weight the float when floating on water; a ball having a diameter larger than the small end of said tube reciprocably mounted in said tube in position to wedge against a line passing through said tube; detent retaining means in the large end of said tube for retaining said ball therein; and a pair of arcuate outwardly directed prongs oppositely extending laterally from each end of said tube for holding a coil of line which extends from the small end of said tube, which coil is wrapped from end to end around said tube.

References Cited

UNITED STATES PATENTS

| | | | |
|---|---|---|---|
| 2,212,941 | 8/1940 | Johnson | 43—43.11 |
| 2,254,800 | 9/1941 | Furdas | 43—43.11 |
| 2,694,878 | 11/1954 | Martens | 43—43.11 |
| 2,722,767 | 11/1955 | Grady | 43—43.11 |
| 2,737,752 | 3/1956 | Childress | 43—44.88 |
| 3,144,729 | 8/1964 | Jonassen | 43—43.11 |

SAMUEL KOREN, *Primary Examiner.*

D. J. LEACH, *Assistant Examiner.*